United States Patent [19]

Woodling

[11] 3,707,923
[45] Jan. 2, 1973

[54] VARIABLE SPEED CONVEYOR
[75] Inventor: Gerald L. Woodling, Akron, Ohio
[73] Assignee: The Goodyear Tire & Rubber Company, Akron, Ohio
[22] Filed: Aug. 19, 1971
[21] Appl. No.: 173,090

[52] U.S. Cl. .................. 104/137, 198/110, 198/183
[51] Int. Cl. ............................................. B65g 17/24
[58] Field of Search .......... 104/18, 25, 134, 135, 137; 198/76, 110, 183

[56] References Cited

UNITED STATES PATENTS 3,653,489 4/1972 Tullis .................................. 198/183
2,905,100 9/1959 Kendall .................................. 198/76
3,608,713 9/1971 Crosby .............................. 198/183 X Primary Examiner—Drayton E. Hoffman
Assistant Examiner—D. W. Keen
Attorney—F. W. Brunner et al.

[57] ABSTRACT

A conveying system for accelerating or decelerating passenger and load carrying platforms in which the platforms engage cylindrical surfaces of a series of rollers linked together and pulled along inclined rails. The rollers also have substantially conical faces which engage the rails at areas of different diameters causing the speed of revolution of the rollers to vary and thereby changing the speed of the platforms.

16 Claims, 7 Drawing Figures

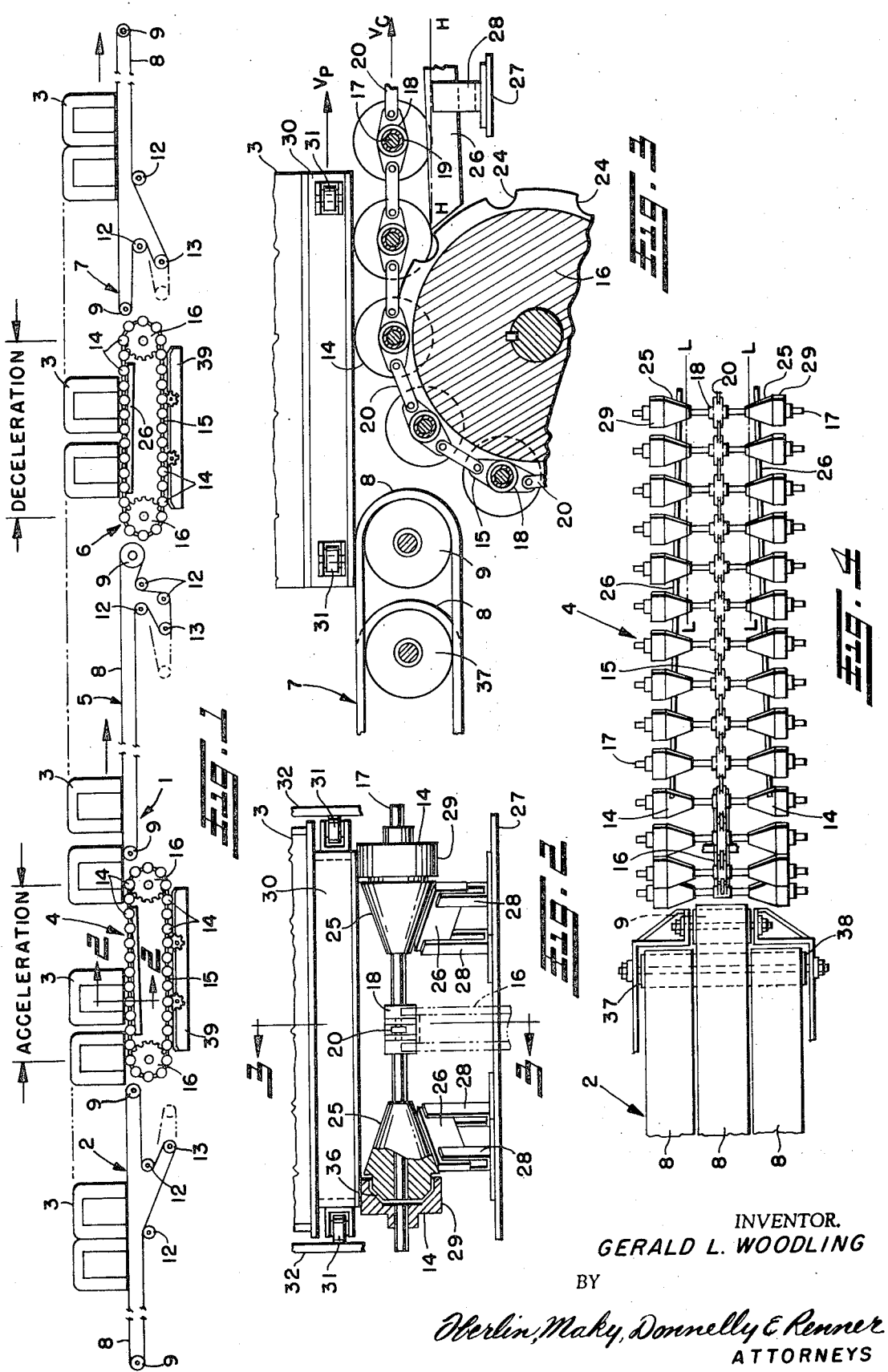

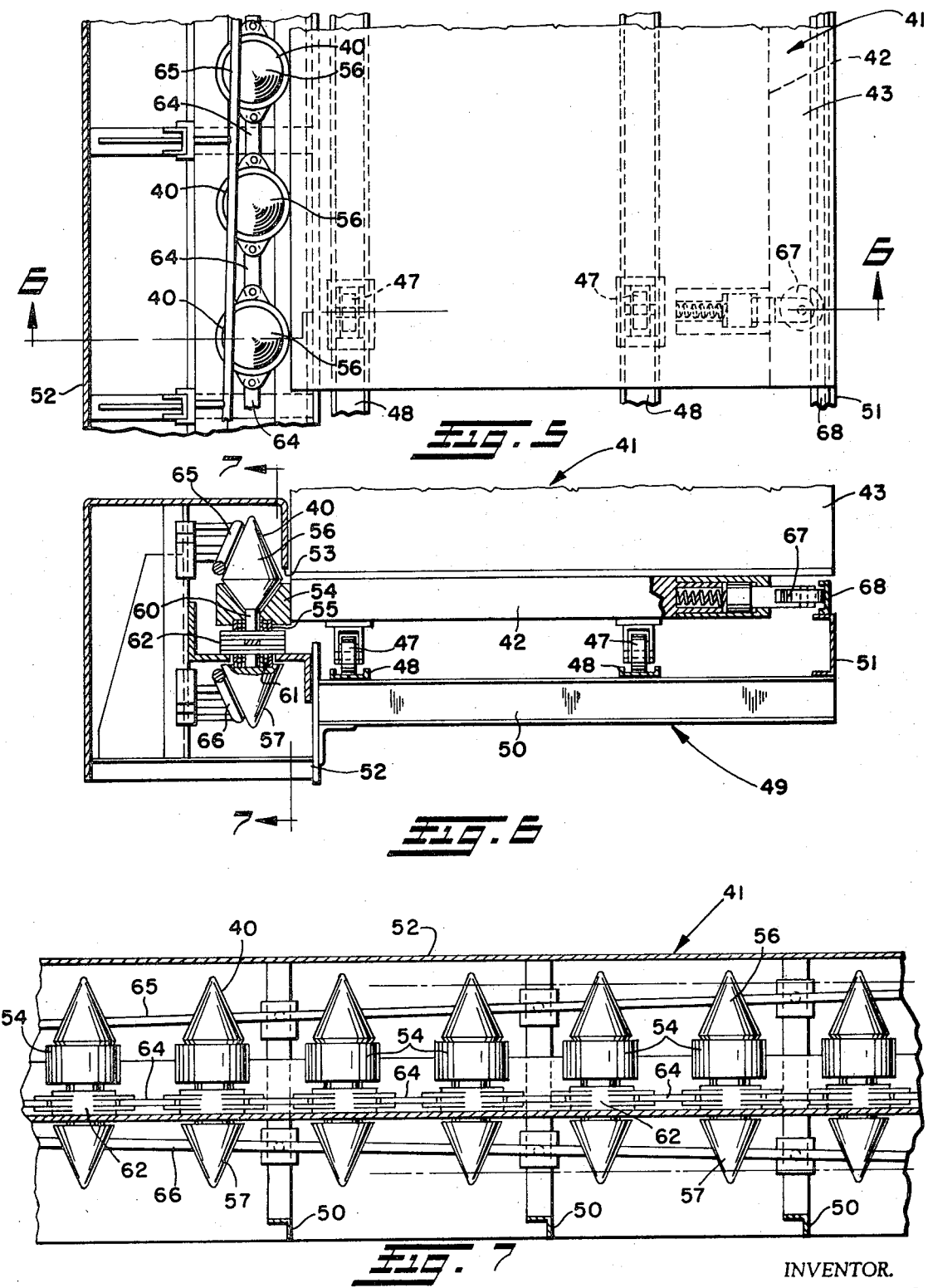

VARIABLE SPEED CONVEYOR

This invention relates generally, as indicated, to the acceleration and deceleration sections of a passenger or load carrying conveying system in which it is desirable and necessary to smoothly change the speed of the passenger or load carrying platforms or containers between a high speed section and a low speed section at which the loading and unloading takes place.

Passenger carrying systems of the type referred to have included high speed belts for carrying the platforms at a high speed and low speed belts for carrying the platforms at a low speed with a series of rollers between the high speed and low speed belts for accelerating and decelerating the platforms. The speed of the rollers have been varied by using individual motors running at the different speeds necessary to change the speed of the platform. A variable speed drive of this type requires a substantial initial cost because of the number of motors and drives required. Also the maintenance required is substantial because of the number of drives and moving parts.

With the foregoing in mind, it is the principal object of this invention to provide a variable speed conveyor of a simple construction having a minimum of parts for accelerating and decelerating a passenger or load carrying platform.

Another object is to provide a series of driving rollers which are moved in the same direction as the supported platform for propelling the platform.

A further object of the invention is to provide rollers having tapered surfaces for engaging stationary supporting surfaces to obtain variable speeds of rotation of the rollers.

A still further object of the invention is to provide an endless member connecting the rollers and driving them at the same speed.

Another object of the invention is to provide fixed or adjustable stationary supporting rails in engagement with the tapered portions of the rollers and inclined so as to engage different portions of the tapered sections and thereby rotate the rollers at variable speeds.

A further object of the invention is to provide for inclining the rails so as to maintain a substantially constant horizontal position of the platform with respect to the rollers.

A still further object of the invention is to provide for guiding the platform to maintain it in a desired path to which the rails are inclined.

Another object of the invention is to provide a friction or overrunning clutch or coupling between a tapered portion and a cylindrical portion of a roller to control the effective propelling force of the cylindrical portion against the load carrying platform.

These and other objects of the present invention may be achieved by providing a series of rollers linked together by a chain or other endless member and carried along the path of the conveyor and in the same direction the platforms are moved. The rollers have cylindrical driving surfaces in engagement with the platforms and they also have tapered surfaces in engagement with inclined rails. The diameter of the portion of the tapered section of the rollers engaged by the rails determines the speed of rotation of the rollers and therefore the speed at which the platforms tend to be driven.

Normally the speed at which the rollers are being carried along the conveyor path is constant; however, depending upon the diameter of the tapered portion of the rollers which is engaged by the rails, the speed at which the platform is being driven may vary from twice the speed to greater than twice the speed at which the rollers are being carried along the path of the conveyor depending upon the smallest diameter of the tapered section of the rollers which is contacted by the rail. The rails may provide the support for the platforms through the rollers or the platforms may be supported on other wheels or rollers and obtain propulsion only from the tapered rollers of this invention.

To the accomplishment of the foregoing and related ends the invention, then, comprises the features hereinafter fully described and particularly pointed out in the claims, the following description and the annexed drawings setting forth in detail a certain illustrative embodiment of the invention and a modification thereof, this being indicative, however, of but some of the various ways in which the principles of the invention may be employed.

In the annexed drawings:

FIG. 1 is a schematic side elevational view of a portion of a typical modern passenger conveyor system incorporating the preferred form of mechanism for accelerating and decelerating passenger carrying platforms.

FIG. 2 is an enlarged fragmentary sectional view taken along the plane of line 2—2 of FIG. 1, parts being broken away and shown in phantom lines.

FIG. 3 is a fragmentary sectional view taken along the plane of line 3—3 of FIG. 2.

FIG. 4 is an enlarged fragmentary plan view of the conveyor system shown in FIG. 1 without the platforms.

FIG. 5 is a fragmentary plan view of a modified variable speed mechanism embodying the invention in which the driving rollers are located at one side of the platforms.

FIG. 6 is a fragmentary sectional view taken along the plane of line 6—6 of FIG. 5.

FIG. 7 is a fragmentary longitudinal sectional view taken along the plane of line 7—7 of FIG. 6.

Referring to FIG. 1, there is schematically shown a transportation system 1 for conveying passengers having a low speed section 2 carrying cabs 3 to an acceleration section 4. The cabs 3 are propelled at an increasingly greater speed along the acceleration section 4 to a high speed section 5 which extends over the greater length of the conveyor system 1. The cabs 3 are then conveyed from the high speed section 5 to a deceleration section 6 which carries and decreases the speed of the cabs before they are conveyed to a low speed section 7. In the example shown, the passengers would board the cabs 3 in the low speed section 2 after which they would be accelerated in the acceleration section 4 and travel the greatest distance in the high speed section 5. The passengers would then be decelerated in the cabs 3 in the deceleration section 6 and leave cabs in the low speed section 7. The low speed sections 2 and 7 and the high speed section 5 may have endless belts 8 carried by pulleys 9 and passing over idler pulleys 12 and take-up pulleys 13. In the acceleration section 4, the cabs 3 are supported by a series of driving rollers 14 linked together by an endless member such as a chain 15 extending around sprockets 16 with one or both of the sprockets being driven in a clockwise direction, as shown in FIGS. 1 and 3.

A more detailed illustration of the acceleration section 4 is shown in FIGS. 2, 3 and 4. The driving rollers 14 are preferably mounted in pairs on shafts 17 extending transversely of a predetermined path over which the cabs 3 are conveyed. The shafts 17 are spaced apart longitudinally of the path of the conveyor so that each of the cabs 3 is supported by more than one of the pairs of driving rollers 14. Each of the shafts 17 has a chain link 18 containing a bushing 19 through which the shaft is rotatably extended. Snap rings, pins or flanges, not shown, may be used to maintain the chain link 18 in position at approximately the mid point between the driving rollers 14. Each chain link 18 may be linked to the chain link 18 of an adjacent shaft 17 by connecting links 20 or the chain links may be directly coupled or may connect adjacent shafts 17 in standard roller chain fashion. The sprockets 16 have concave recesses 24 for receiving the chain links 18 or the shafts 17 and thereby provide a positive drive of the driving rollers 14 along the acceleration section 4.

Each of the driving rollers 14 has a tapered portion 25 in which the diameter of the surface varies axially. In the preferred embodiment shown, the diameter of the tapered portions 25 decreases towards the center or towards the other driving roller of each pair. The tapered portion 25 is engageable by longitudinally extending rails 26 mounted on a stationary platform structure 27 and held in an inclined canted position by supporting members 28.

Each of the driving rollers 14 has a cylindrical driving portion 29 with a diameter greater than the tapered portion 25 to provide driving engagement of the surface of the cylindrical driving portions with load carrying platforms 30 of the cabs 3. The load carrying platforms 30 may have guide rollers 31 at the side edges for engagement with side members 32 of a balustrade or other stationary structure at the sides of the predetermined path over which the cabs 3 are propelled.

As shown in FIG. 2, a space is provided between the tapered portion 25 and cylindrical driving portion 29 of the driving rollers which may contain a slip clutch 36 to provide for the situation in which one of the platforms 30 is engaged by more than one of the driving rollers 14 and the driving rollers are being rotated at different speeds. It may also be desirable to use an overrunning clutch instead of the slip clutch 36 or in some cases a bearing surface may be inserted in place of the clutch 36 so that only some of the driving rollers 14 are actually driving the platforms 30.

As shown in FIG. 4, the rails 26 of the acceleration section 4 are inclined to a longitudinal line L—L extending in the direction of the predetermined path of the cabs along the conveyor system and accordingly engage surfaces of the tapered portion 25 of each of the driving rollers 14 at positions of different diameters as the rollers are pulled along the acceleration section 4 from the low speed section 2 to the high speed section 5. As shown in FIG. 3, the velocity of the chain $V_c$ is approximately one-half the velocity of the platform $V_p$ at the position where the platform 30 leaves the low speed section 7 and engages the driving rollers 14. At this position the diameter of the tapered portion 25 of the roller 14 is approximately the same as the diameter of the cylindrical driving portions 29. As the driving rollers 14 move to the right as seen in FIG. 3 along the rails 26, the diameter of the tapered portion 25 being engaged by the rails is decreased and consequently the speeds of rotation of the driving rollers 14 are increased, accelerating the load carrying platforms 30 to a velocity $V_p$ which may be several times the velocity $V_c$ of the chain 15 and the rollers 14.

In addition to the inclination of the rails 26 at an angle to the longitudinal lines L—L, the rails may also be inclined from the horizontal at an angle to a horizontal line indicated by line H—H in FIG. 3. This compensates for the change in diameter of the tapered portion 25 engaged by the rails 26 so that the platforms 30 will continue in a horizontal plane. The canted positioning of the rails 26 therefore not only provides for acceleration and support of the driving rollers 14 but also compensates for the change in diameter of the surfaces being engaged in the tapered portion 25.

It will be understood that if desired, the rails 26 may be adjustably mounted in the supporting members 28 and on the stationary platform structure 27 to obtain the desired inclination of the rails to provide the necessary acceleration either to obtain a fixed velocity distance relationship or to vary this relationship at desired times. It may also be desirable to extend the rails 26 in a position where they are not inclined for obtaining a constant speed over a desired portion of the system.

An example of this is shown in the deceleration section 6 where the rails 26 are inclined in the opposite direction from the rails in the acceleration section 4. In the deceleration section 6, the platforms 30 leave the belt 8 of the high speed section 5 with a high velocity $V_p$ and the driving rollers 14 which are first engaged by the platform are rotated at a high speed through engagement of the tapered portions 25 at surfaces having a relatively small diameter. Then as the platforms 30 move toward the low speed section 7, the speed of rotation of the rollers 14 is decreased as the tapered portions 25 engage the rails 26 at surfaces having a greater diameter. This increase in diameter is compensated for by the downward inclination of the rails 26 in the direction of the low speed section 7.

With reference to FIGS. 3 and 4, the belts 8 of the low speed section 2 may pass around three pulleys 9, 37 and 38 at the end where they overlap the driving rollers 14 passing over the sprockets 16. As shown, side pulleys 37 and 38 are offset and recessed from the center pulley 9 to provide clearance for the movement of the driving rollers 14 around the sprockets 16. This same arrangement may be utilized at the ends of the high speed section 5 and low speed section 7.

In this embodiment, the shafts 17 are connected by the chain links 18 and 20 at a point midway between the driving pulleys 14 which is advantageous in situations where the cabs 3 are conveyed around a curve. A similar result may be obtained by utilizing crossed connecting links between the adjacent shafts and rollers.

The upper run of the chain 15 between the sprockets 16 carries rollers 14 which engage the platforms 30 and propel the cabs 3. However, the lower run is returned without any engagement other than with the guide member 39 to support the rollers and maintain them in alignment. A transportation system embodying this invention may be designed in which this return run or a return run passing around a horizontal sprocket is also in engagement with platforms 30 of cabs 3 of another part of the conveyor system and therefore the driving rollers 14 may be effectively used on the return run as well as on the forward run to propel platforms 30.

It is also contemplated that the tapered portion 25 of the driving rollers 14 may be installed with the taper extending to the outside of the conveyor rather than toward the inside as shown in the drawings. This would also entail canting the rails 26 in a different direction.

In the modification shown in FIGS. 5, 6 and 7, driving rollers 40 are mounted for rotation about vertical axes along one side of a conveyor system 41 having platforms 42 of passenger carrying cabs 43 supported by wheels 47 mounted on the underside of the platforms and supported by tracks 48 extending longitudinally of the predetermined path of the conveyor. The tracks 48 are mounted on a supporting structure 49 including transverse beams 50 connecting a longitudinal side member 51 and a housing 52 containing the driving rollers 40.

An opening 53 along the edge of the housing 52 facing the platform 42 is provided for a cylindrical driving portion 54 of the driving rollers 40 to engage the edge of the platforms 42. This cylindrical driving portion 54 is mounted on bearings 55 and is in engagement with tapered portions 56 of the driving rollers 40 which is connected to another tapered portion 57 by a vertical shaft 60 also mounted in bearings 61 contained in a chain member 62 having a bushing for the shaft 60 extending through the chain member and connecting the tapered portions 56 and 57. The chain members 62 of adjacent driving rollers 40 are connected by connecting links 64 or the chain members may be directly coupled or connect adjacent shafts in standard roller chain fashion. The chain made up of the chain members and connecting links may be driven by sprockets or other driving means well known in the art but not shown. This would drive the driving rollers 40 in the same direction in which the platforms 42 are to be propelled.

Canted rods 65 and 66 are mounted in the housing 52 for engagement with the tapered surfaces of the tapered portions 56 and 57 of the driving rollers 40. With reference to FIG. 7, as the rollers 40 are moved to the right, the tapered surfaces of lesser diameter are engaged by the rods 65 and 66 and assuming a constant speed of movement of the rollers and chain members 62 and 64, the speed of rotation of the rollers will be increased providing acceleration of the platform 42 in engagement with the cylindrical driving portions 54 of the rollers.

At the opposite side of the platforms 42, spring loaded rollers 67 are mounted in the edges of the platforms and engage side rails 68 mounted on the side members 51 of the supporting structure 49. Accordingly, the platforms 42 will be urged against a cylindrical driving portion 54 of the driving rollers 40 and provide the necessary frictional contact. It is understood that other means of urging the platform edge into contact with this surface such as gravity may also be used. It is also contemplated that it may be desirable in some installations to have the driving rollers 40 on both sides or beneath the platforms 42.

As shown in FIG. 6, a space is provided between the cylinder driving portion 54 and the tapered portion 56 of the driving rollers 40 for a clutch which may be a slip clutch, an overrunning clutch or, in some cases, a sliding bearing to accommodate the different driving speeds of the driving portions of adjacent driving rollers in a manner such as that explained above for the modification shown in FIGS. 1, 2, 3 and 4.

From the foregoing, it is evident that acceleration and deceleration of the passenger carrying cabs 3 and 43 can be obtained smoothly and without complicated mechanism by the relative simple construction of this invention which may be readily installed and easily maintained on a passenger conveyor system. While certain representative embodiments and details have been shown for the purpose of illustrating the invention, it will be apparent to those skilled in the art that various changes and modifications may be made therein without departing from the spirit or scope of the invention.

I, therefore, particularly point out and claim as my invention:

1. A transportation system comprising a load carrying platform movable along a predetermined path, a driving roller, a rail extending along said predetermined path, means for moving said roller along said path and in engagement with said rail for rotating said roller, said load carrying platform being in engagement with and propelled by said roller and said roller having a surface with a diameter varying axially thereof for engagement of said roller with said rail at different axial positions along said roller to vary the speed of rotation of said roller whereby the speed at which said platform is propelled is varied.

2. A transportation system according to claim 1 wherein said rail extends along said predetermined path at an inclination to the longitudinal line of direction of said path for progressive engagement of said rail with different axial positions along said roller as it is moved along said path.

3. A transportation system according to claim 2 wherein the vertical position of said rail is varied to compensate for the change in diameter of the portion of said roller in engagement with said rail whereby the level or grade of said platform will be maintained substantially constant as it moves along said path.

4. A transportation system according to claim 3 wherein said surface of said roller is tapered from a larger diameter to a smaller diameter with said platform being engageable by said surface at a position having a larger diameter and said rail being engageable with said surface at areas having different diameters to vary the speed of rotation of said roller and thereby vary the speed of the platform.

5. A transportation system according to claim 4 wherein said driving roller is linked to adjacent driving rollers for movement along said path whereby the diameters of the surfaces of said rollers engaging said rail vary therealong for driving said platform at different speeds at different positions along said path.

6. A transportation system according to claim 5 wherein said rollers are linked together by an endless member extending around and in engagement with a drive member for moving the rollers in the same direction as said platform.

7. A transportation system according to claim 6 wherein said endless member is a chain extending around and in engagement with a driving sprocket.

8. A transportation system according to claim 6 wherein each said driving roller is one of a pair of rollers spaced apart transversely of said predetermined path and each said rail is one of a pair of rails extending longitudinally of said path with one of said pair of rollers engaging one of said pair of rails and the other of said pair of rollers engaging the other of said pair of rails.

9. A transportation system according to claim 8 wherein the rollers of said pair taper towards each other and the rails of said pair of rails are positioned along said path in a diverging relationship to provide deceleration of the platforms.

10. A transportation system according to claim 8 wherein the surfaces of said pair of rollers taper towards each other and the rails of each of said pair are positioned along the path to converge and provide acceleration of said platform.

11. A transportation system according to claim 6 wherein said rollers are mounted on transverse shafts carried by said endless member and connected by links between the shafts for transferring the pulling forces and maintaining the shafts in spaced-apart positions.

12. A transportation system according to claim 5 wherein the portion of said roller in contact with said rail is connected to the portion of said surface in contact with said platform through a clutch member whereby relative rotation of said portion in contact with said rail and said portion in contact with said platform is accommodated.

13. A transportation system according to claim 5 wherein said rollers rotate about substantially vertical axes and move along the side of said path.

14. A transportation system according to claim 13 wherein said rollers engage one side edge of said platform for propelling the platform at a variable speed.

15. A transportation system according to claim 14 wherein said platform has supporting rollers contained in tracks extending longitudinally of said path.

16. A transportation system according to claim 14 wherein resilient means are connected to said platform for urging the side edge of said platform into engagement with said driving rollers.

* * * * *